(12) United States Patent
Kim et al.

(10) Patent No.: US 9,846,084 B2
(45) Date of Patent: Dec. 19, 2017

(54) VACUUM HEAT TREATMENT APPARATUS (75) Inventors: Byung Sook Kim, Seoul (KR); Jung Eun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 263 days.

(21) Appl. No.: 14/130,251

(22) PCT Filed: Jun. 28, 2012

(86) PCT No.: PCT/KR2012/005117
§ 371 (c)(1),
(2), (4) Date: Dec. 30, 2013

(87) PCT Pub. No.: WO2013/002571
PCT Pub. Date: Jan. 3, 2013

(65) Prior Publication Data
US 2014/0127635 A1    May 8, 2014

(30) Foreign Application Priority Data

Jun. 28, 2011   (KR) .................. 10-2011-0062824

(51) Int. Cl.
*F27D 7/06*    (2006.01)
*G01K 1/12*    (2006.01)
(Continued)

(52) U.S. Cl.
CPC ............... *G01K 1/12* (2013.01); *C21D 1/74* (2013.01); *C21D 1/773* (2013.01); *F27B 5/04* (2013.01);
(Continued)

(58) Field of Classification Search
CPC ........ F27D 21/00; F27D 21/0014; G01K 1/12
(Continued)

(56) References Cited

U.S. PATENT DOCUMENTS 4,995,733 A * 2/1991 Thomas ................ G01K 1/105
                                                    136/233
5,696,348 A * 12/1997 Kawamura ............. G01K 7/04
                                                    136/201
(Continued)

FOREIGN PATENT DOCUMENTS

| JP | 08261844 A | * 10/1996 |
| JP | 2000088667 A | * 3/2000 |
| KR | 10-0196732 B1 | 6/1999 |
| KR | 10-1999-0066851 A | 8/1999 |
| KR | 10-2005-0104683 A | 11/2005 |

(Continued)

OTHER PUBLICATIONS

International Search Report, dated Jan. 4, 2013, in International Application No. PCT/KR2012/005117, filed Jun. 28, 2012.

*Primary Examiner* — Nathaniel Herzfeld
(74) *Attorney, Agent, or Firm* — Saliwanchik, Lloyd & Eisenschenk (57) ABSTRACT

A vacuum heat treatment apparatus according to the embodiment comprises a chamber; a thermal insulator in the chamber; a reaction container in the thermal insulator; a heating member between the reaction container and the the thermal insulator for heating the reaction container; and a temperature measuring member in or on a surface of the reaction container, wherein the temperature measuring member comprises a thermocouple and a protective tube surrounding the thermocouple, and the protective tube comprises tungsten (W), tantalum (Ta), or silicon carbide (SiC).

9 Claims, 5 Drawing Sheets

(51) Int. Cl.
*C21D 1/74* (2006.01)
*C21D 1/773* (2006.01)
*F27B 5/04* (2006.01)
*F27B 5/06* (2006.01)
*F27B 17/00* (2006.01)
*F27D 21/00* (2006.01)
*F27B 5/14* (2006.01)
*F27D 19/00* (2006.01)

(52) U.S. Cl.
CPC ............ *F27B 5/06* (2013.01); *F27B 17/0016* (2013.01); *F27D 7/06* (2013.01); *F27D 21/0014* (2013.01); *F27B 2005/143* (2013.01); *F27D 2019/0025* (2013.01)

(58) Field of Classification Search
USPC .......................................................... 432/32
See application file for complete search history.

(56) References Cited

U.S. PATENT DOCUMENTS

| | | | | |
|---|---|---|---|---|
| 6,336,971 | B1* | 1/2002 | Nagato | C30B 23/00 117/104 |
| 2002/0136835 | A1* | 9/2002 | Li | C04B 41/009 427/376.2 |
| 2002/0144647 | A1* | 10/2002 | Golan | C30B 23/00 117/109 |
| 2003/0217767 | A1* | 11/2003 | Kushihashi | G01K 1/12 136/230 |
| 2009/0056452 | A1* | 3/2009 | Liu | G01N 29/022 73/579 |
| 2013/0223479 | A1* | 8/2013 | Satou | G01K 1/12 374/163 |

FOREIGN PATENT DOCUMENTS

KR          10-0950681  B1     3/2010

* cited by examiner

VACUUM HEAT TREATMENT APPARATUS

CROSS-REFERENCE TO RELATED APPLICATIONS

This application is the U.S. national stage application of International Patent Application No. PCT/KR2012/005117, filed Jun. 28, 2012, which claims priority to Korean Application No. 10-2011-0062824, filed Jun. 28, 2011, the disclosures of each of which are incorporated herein by reference in their entirety.

TECHNICAL FIELD

The embodiment relates to a vacuum heat treatment apparatus.

BACKGROUND ART

A vacuum heat treatment apparatus, which heat-treats a raw material in a crucible to form a desired material, performs the heat treatment in vacuum environment to prevent contamination from surroundings.

In such a vacuum heat treatment apparatus, the raw material is heated by a heater installed in the thermal insulator placed in a chamber maintained in a vacuum state. The vacuum heat treatment apparatus may comprise a thermocouple in order to measure the temperatures at each part of the vacuum heat treatment apparatus while heating the raw material.

At this time, in order to prevent the thermocouple from corroding or cracking by a reaction gas, a protective tube generally surrounds an outer surface of the thermocouple. However, since a conventional protective tube is formed of molybdenum (Mo) or aluminum oxide ($Al_2O_3$), the conventional protective tube formed of the molybdenum (Mo) or the aluminum oxide ($Al_2O_3$) material reacts with the reaction gas, so the protective tube may be corroded and the gas-tightness of the protective tube may be degraded. That is, the reaction gas directly exerts an influence upon the thermocouple, so that the life span of the thermocouple may be shortened.

DISCLOSURE OF INVENTION

Technical Problem

The embodiment provides a vacuum heat treatment apparatus capable of improving the quality of a material for a protective tube of a thermocouple to shorten the working processes by lengthening the life span of the thermocouple.

Solution to Problem

A vacuum heat treatment apparatus according to the embodiment comprises a chamber; a thermal insulator in the chamber; a reaction container in the thermal insulator; a heating member between the reaction container and the the thermal insulator for heating the reaction container; and a temperature measuring member in or on a surface of the reaction container, wherein the temperature measuring member comprises a thermocouple and a protective tube surrounding the thermocouple, and the protective tube comprises tungsten (W), tantalum (Ta), or silicon carbide (SiC).

A vacuum heat treatment apparatus according to the embodiment comprises a chamber; a thermal insulator in the chamber; a reaction container in the thermal insulator; a heating member between the reaction container and the the thermal insulator for heating the reaction container; and a temperature measuring member in or on a surface of the reaction container, wherein the temperature measuring member comprises a thermocouple, a protective tube surrounding the thermocouple, and a heat-resistant coating surrounding the protective tube.

Advantageous Effects of Invention

The vacuum heat treatment apparatus according to the embodiment comprises the temperature measuring member having the protective tube of the thermocouple formed of a material such as tungsten, tantalum, or silicon carbide. Since the tungsten, tantalum, or silicon carbide has a high melting point and a low thermal expansion coefficient, the protective tube is stable at high temperatures and has high dimensional stability, so that the protective tube is prevented from cracking by the reaction gas. Thus, the life span of the thermocouple can be improved so that the cost required for exchanging the thermocouple can be reduced.

In addition, in the vacuum heat treatment apparatus according to the embodiment, a heat-resistant coating comprising tungsten, tantalum, or silicon carbide is coated on molybdenum or aluminum oxide, so that the manufacturing cost of the protective tube can be reduced. Further, since the protective tube has the higher melting point and the lower thermal expansion coefficient as compared with the conventional protective tube, the life span of the thermocouple can be increased.

That is, by changing the material of the thermocouple with the tungsten, tantalum, or silicon carbide, the life span of the thermocouple can be prevented from being shortened by the crack of the protective tube.

MODE FOR THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or over the other substrate, layer (or film), region, pad, or pattern, or one or more intervening layers may also be present.

Since the thickness and size of each layer shown in the drawings may be modified for the purpose of convenience or clarity of description, the size of elements does not utterly reflect an actual size.

Hereinafter, the embodiments of the present invention will be described with reference to accompanying drawings.

Figure 1:
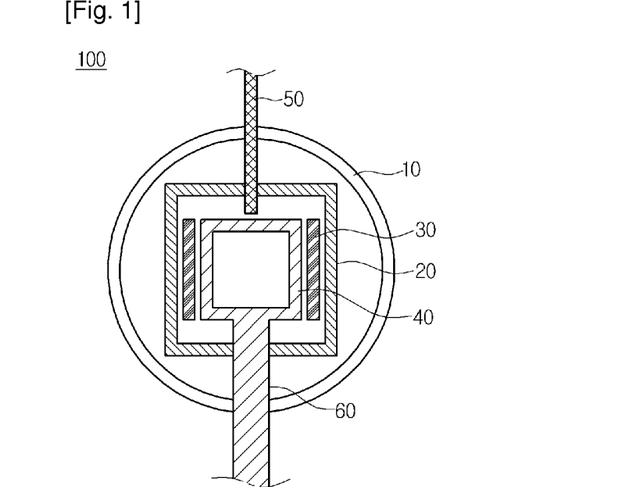
FIG. 1 is a schematic view of the vacuum heat treatment apparatus according to the embodiment.

FIG. 1 is a schematic view of the vacuum heat treatment apparatus according to the embodiment.

Referring to FIG. 1, the vacuum heat treatment apparatus according to the embodiment comprises a chamber 10; a thermal insulator 20 placed in the chamber 10; a reaction container 40 placed in the thermal insulator 20; a heating member 30 placed between the reaction container 40 and the the thermal insulator 20 for heating the reaction container 40; and a temperature measuring member 50 placed in or on a surface of the reaction container, where the temperature measuring member 50 comprises a thermocouple 51 and a protective tube 54 surrounding the thermocouple 51, and the protective tube 54 comprises tungsten (W), tantalum (Ta), or silicon carbide (SiC).

The above configuration will be described in more detail below.

An atmospheric gas is introduced into the chamber 10 through an atmospheric gas supply pipe (not shown). An inert gas such as argon (Ar) or helium (He) may be used as the atmospheric gas.

The reaction container 40 is placed in the thermal insulator 20. A mixed raw material is filled in the reaction container 40 and reacts to generate a desired material. The reaction container 40 may comprise graphite to withstand high temperatures.

The heating member 30 for heating the reaction container 40 may be placed between the thermal insulator 20 and the reaction container 40. The heating member 30 may provide heat to the reaction container 40 by various methods. For example, the heating member 30 may apply a voltage to the graphite to generate the heat.

The temperature measuring member 50 may be placed in or on a surface of the reaction container 40. The temperature measuring member 50 may measure the temperature in the vacuum heat treatment apparatus. The temperature measuring member 50 may comprise the thermocouple 51 and the protective tube 54 surrounding an outer surface of the thermocouple 51. The protective tube 54 may surround the outer surface of the thermocouple 51 to prevent the thermocouple 51 from making contact with the reaction gas.

For example, the vacuum heat treatment apparatus may be used for an apparatus for manufacturing silicon carbide, which manufactures the silicon carbide by heating the mixed raw material comprising carbon and silicon. However, the embodiment is not limited thereto.

Figure 2:
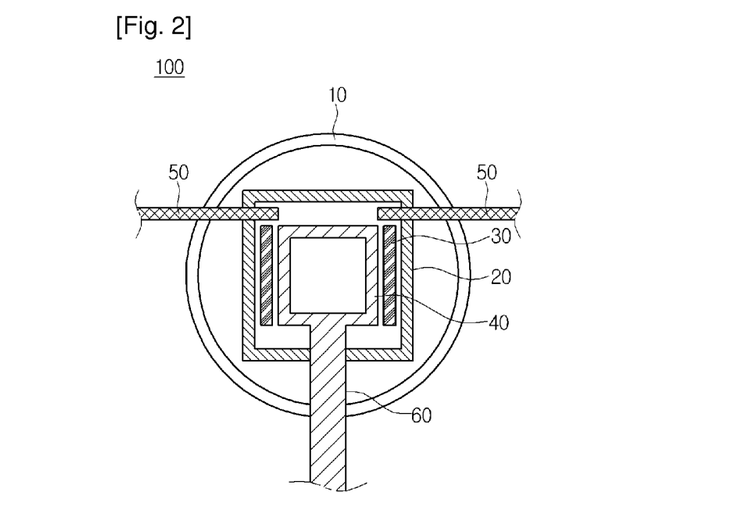
FIG. 2 is a schematic view of the vacuum heat treatment apparatus according to the modified embodiment.
Figure 5:
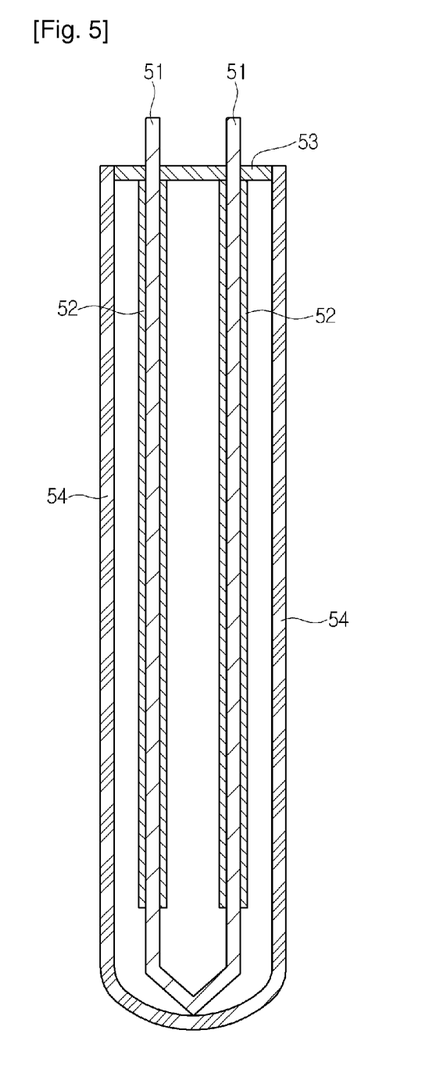
FIG. 5 is a sectional view of the temperature measuring member according to the embodiment.
Figure 6:
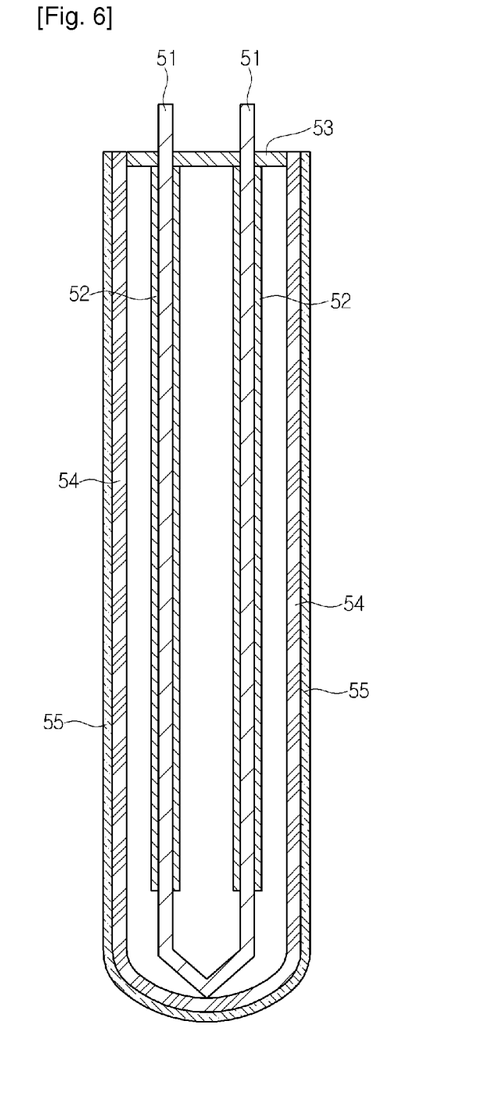
FIG. 6 is a sectional view of the temperature measuring member coated with a heat-resistant coating according to the embodiment.

Hereinafter, the temperature measuring member 50 will be described with reference to FIGS. 2 to 6 as well as FIG. 1. FIG. 2 is a schematic view of the vacuum heat treatment apparatus according to the modified embodiment, FIG. 3 is an exploded perspective view of the temperature measuring member 50 according to the embodiment, FIG. 4 is a perspective view of the temperature measuring member 50 according to the embodiment, and FIG. 5 is a sectional view of the temperature measuring member 50 according to the embodiment, and FIG. 6 is a sectional view of the temperature measuring member 50 on which the heat-resistant coating 55 is formed according to the embodiment.

Referring to FIGS. 1 and 2, the temperature measuring member 50 may be placed at an upper portion of the chamber 10, or at a left or right side of the chamber 10. Preferably, the temperature measuring member 50 may be placed on a surface of the reaction chamber 40 by passing through the upper portion, the left side and the right side of the chamber 10. The location of the temperature measuring member 50 is not limited to the present embodiment. The temperature measuring member 50 may be placed in the reaction container 40 by passing through an edge portion or a low portion of the chamber 10.

Figure 3:
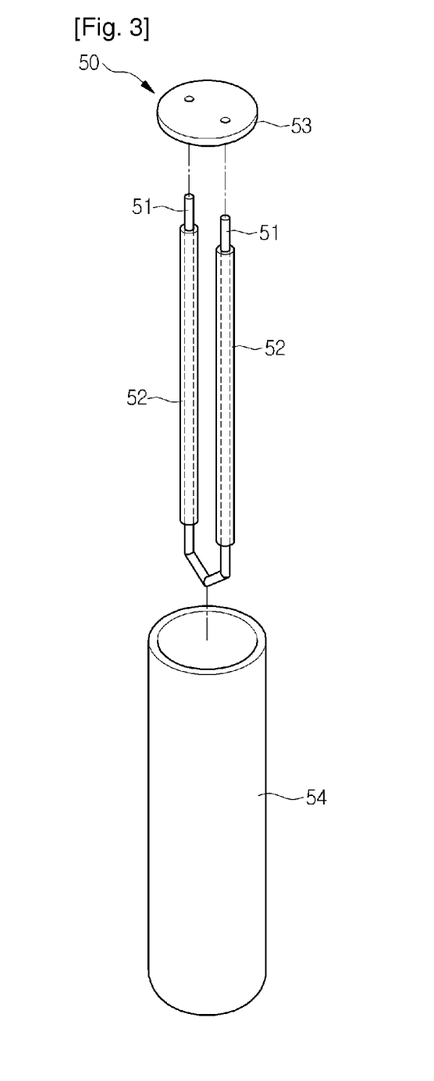
FIG. 3 is an exploded perspective view of the temperature measuring member according to the embodiment.
Figure 4:
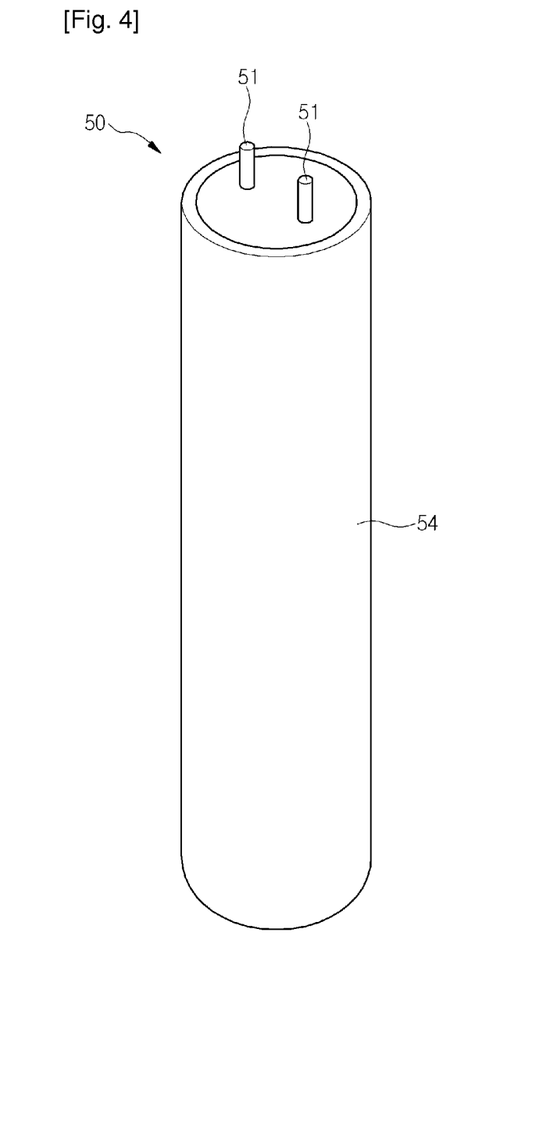
FIG. 4 is a perspective view of the temperature measuring member according to the embodiment.

Referring to FIGS. 3 and 4, the temperature measuring member 50 may comprise a thermocouple 51; a thermal insulator 52 surrounding the thermocouple 51; a protective tube 54 surrounding the thermocouple 51 and the thermal insulator 52; and a sealing member 53 for sealing an upper portion of the protective tube 54.

The thermocouple 51 comprises two kinds of metals. The ends of the two kinds of metals are joined to each other. One contact tip of the two metals serves as a reference tip and the other contact tip is placed on a location to be measured. In this state, the thermocouple 51 measures the temperature based on electromotive force, which is generated proportional to a temperature difference.

At this time, since a reaction gas generated in the reaction container 40 may exert an influence upon the thermocouple 51, the thermocouple 51 may be surrounded by the protective tube 54.

In the related art, the protective tube 54 has been formed of aluminum oxide (Al2O3) or molybdenum (Mo) which withstands the temperature in the range of 1700° C. to 1800° C. However, aluminum oxide ($Al_2O_3$) or molybdenum (Mo) may cause several problems when a high-purity product is heat-treated or when aluminum oxide ($Al_2O_3$) or molybdenum (Mo) is used in vapor reaction equipment in which a large quantity of reaction gas is generated. That is, the aluminum oxide ($Al_2O_3$) may react with graphite, which is used for the thermal insulator 20 and the heating member 30, or the reaction gas, such as carbon monoxide gas or carbon dioxide gas, so that the aluminum oxide ($Al_2O_3$) may be corroded. Further, the molybdenum (Mo) may react with carbon so that the crystalline structure of the molybdenum (Mo) may be changed into Mo2C, resulting in crack of the protective tube 54. That is, the molybdenum (Mo) may cause the crack of the protective tube 54.

Thus, since the gas-tightness of the protective tube 54 formed of the molybdenum (Mo) or aluminum oxide ($Al_2O_3$) material deteriorates and the protective tube 54 cracks, the reaction gas directly makes contact with the thermocouple 51, so that the life span of the thermocouple 51 may be reduced.

Therefore, the temperature measuring member 50 according to the embodiment comprises the protective tube 54, which is formed of the tungsten (W), tantalum (Ta) or silicon carbide (SiC) material, or comprises the protective tube 54 formed of molybdenum (Mo) or aluminum oxide ($Al_2O_3$) and coated with a heat-resistant coating 55 comprising tungsten (W), tantalum (Ta) or silicon carbide (SiC).

Referring to FIG. 5, the protective tube 54 of the temperature measuring member 50 may be formed of a raw material comprising the tungsten (W), tantalum (Ta) or silicon carbide (SiC).

The melting points of the tungsten and the tantalum are 3410° C. and 2991° C., respectively. Thus, since the aluminum oxide and the molybdenum have the melting points of 2072° C. and 2621° C., respectively, the aluminum oxide and the molybdenum are stable at high temperatures. Further, the tungsten and the tantalum have low thermal expansion coefficients, such that the dimensional stability may be improved at the high temperature.

Referring to FIG. 6, the protective tube 54 of the temperature measuring member 50 may have a dual structure. That is, the protective tube 54 formed of the aluminum oxide or the molybdenum may be coated with the heat-resistant coating 55 comprising the tungsten (W), tantalum (Ta) or silicon carbide (SiC). The the heat-resistant coating 55 may comprise multiple coating layers formed on the protective tube. That is, the protective tube may be coated with one of the tungsten (W), the tantalum (Ta) and the silicon carbide (SiC), or multiply coated with a mixture thereof.

The protective tube 54 may comprise two materials by coating an outer surface of the protective tube 54 with the heat-resistant coating 55. The material of the protective tube 54 may be molybdenum or aluminum oxide. Further, the material of the heat-resistant coating 55 may be tungsten, tantalum or silicon carbide. The heat-resistant coating 55 may be a nitride, an oxide, or a compound comprising tungsten, tantalum, or silicon carbide. Preferably, the thickness of the heat-resistant coating 55 may be in the range of 80 μm to 100 μm. The thickness range of the heat-resistant coating 55 is the optimal range for preventing the crack of the protective tube 54.

The protective tube 54 having the dual structure may be variously modified according to the embodiment. For example, the protective tube 54 may comprise molybdenum and the outer surface of the molybdenum protective tube 54 may be coated with the heat-resistant coating 55 comprising tungsten, tantalum or silicon carbide. Further, the protective tube 54 may comprise aluminum oxide and the outer surface of the aluminum oxide protective tube 54 may be coated with the heat-resistant coating 55 comprising tungsten (W), tantalum (Ta) or silicon carbide (SiC). In addition, the outer surface of the molybdenum or aluminum oxide protective tube 54 may be coated with the heat-resistant coating 55 comprising a nitride, an oxide, or a compound comprising tungsten, tantalum or silicon carbide.

The melting point of the heat-resistant coating 55 covering the outer surface of the protective tube 54 may be higher than that of the protective tube 54. The heat resistance of the protective tube 54 may be increased by coating the protective tube 54 with the heat-resistant coating 55 which has the melting point higher than that of the protective tube 54.

The gas-tightness of the molybdenum and aluminum oxide protective tubes 54 had been broken when the molybdenum and aluminum oxide protective tubes 54 had been used 5 to 8 times during a gas-tightness test. To the contrary, according to the result of the gas-tightness test, the tungsten protective tube 54 had been used about 50 times or more. That is, the tungsten protective tube 54 had been 10 times more efficient than the conventional protective tube 54.

When using molybdenum as a material of the protective tube of the thermocouple, the molybdenum reacts with a reaction gas generated during the reaction, so that the crystalline structure is changed into $Mo_2C$. Thus, the crack is generated so that the gas tightness of the protective tube is degraded. Thus, since the thermocouple directly reacts with the reaction gas, the life span of the thermocouple is reduced.

Therefore, in the temperature measuring member 50 according to the embodiment, if the protective tube 54 is formed of tungsten (W), tantalum (Ta) or silicon carbide (SiC), or molybdenum (Mo) or aluminum oxide is coated with tungsten (W), tantalum (Ta) or silicon carbide (SiC), the temperature measuring member 50 has a high melting point and a low thermal expansion coefficient, so that the temperature measuring member 50 is stable at high temperatures. Thus, the life span of the temperature measuring member 50 can be lengthened so that the working cost and time can be reduced.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum heat treatment apparatus comprising:
   a chamber;
   a thermal insulator in the chamber;
   a reaction container in the thermal insulator;
   a heating member between the reaction container and the thermal insulator for heating the reaction container; and
   a temperature measuring member in or on a surface of the reaction container;
   wherein the temperature measuring member comprises a thermocouple, an insulator, and a protective tube surrounding the thermocouple, and a heat-resistant coating surrounding the protective tube,
   wherein the heat-resistant coating comprises tungsten (W) or tantalum (Ta),
   wherein the thermocouple is in direct physical contact with the insulator,
   wherein the insulator is spaced apart from the protective tube,
   wherein the thermocouple comprises a first thermocouple and a second thermocouple,
   wherein the first and second thermocouples are in contact with each other,
   wherein a first contact area of the first thermocouple and the insulator is the same as a second contact area of the second thermocouple and the insulator,
   wherein the protective tube comprises molybdenum (Mo) or aluminum oxide ($Al_2O_3$), and
   wherein the heat-resistant coating has a thickness in a range of 80 μm to 100 μm.

2. The vacuum heat treatment apparatus of claim 1, wherein the heat-resistant coating has a melting point higher than a melting point of the protective tube.

3. The vacuum heat treatment apparatus of claim 1, wherein the protective tube is surrounded by a plurality of heat-resistant coatings comprising tungsten (W) or tantalum (Ta).

4. The vacuum heat treatment apparatus of claim 1, wherein the temperature measuring member is located on a surface of the reaction container by passing through a left side or a right side of the chamber.

5. The vacuum heat treatment apparatus of claim 1, wherein the vacuum heat treatment apparatus is used for heating a mixed material comprising carbon and silicon.

6. The vacuum heat treatment apparatus of claim 1, wherein the heat-resistant coating comprises silicon carbide (SiC).

7. A temperature measuring member comprising:
a thermocouple;
a thermal insulator surrounding the thermocouple;
a protective tube surrounding the thermocouple and the thermal insulator;
a heat-resistant coating surrounding the protective tube; and
a sealing member for sealing an upper portion of the protective tube;
wherein the protective tube comprises molybdenum (Mo) or aluminum oxide ($Al_2O_3$), and the heat-resistant coating comprises tungsten (W) or tantalum (Ta);
wherein the thermocouple is in direct physical contact with the thermal insulator,
wherein the thermal insulator is spaced apart from the protective tube,
wherein the thermocouple comprises a first thermocouple and a second thermocouple,
wherein the first and second thermocouples are in contact with each other,
wherein a first contact area of the first thermocouple and the insulator is the same as a second contact area of the second thermocouple and the insulator, and
wherein the heat-resistant coating has a thickness in a range of 80 μm to 100 μm.

8. The temperature measuring member of claim 7, wherein the protective tube is surrounded by a plurality of heat-resistant coatings comprising tungsten (W) or tantalum (Ta).

9. The temperature measuring member of claim 7, wherein the heat-resistant coating has a melting point higher than a melting point of the protective tube.

* * * * *